US010479405B2

United States Patent
Bauer et al.

(10) Patent No.: US 10,479,405 B2
(45) Date of Patent: Nov. 19, 2019

(54) MOUNTING BRACKET FOR A COMPOSITE TRUCK BODY FLOOR

(71) Applicant: Wabash National, L.P., Lafayette, IN (US)

(72) Inventors: Jeffrie S. Bauer, Oxford, IN (US); Scott A. Storz, Lafayette, IN (US)

(73) Assignee: WABASH NATIONAL, L.P., Lafayette, IN (US)

( * ) Notice: Subject to any disclaimer, the term of this patent is extended or adjusted under 35 U.S.C. 154(b) by 64 days.

(21) Appl. No.: 15/686,903

(22) Filed: Aug. 25, 2017

(65) Prior Publication Data

US 2018/0057059 A1 Mar. 1, 2018

Related U.S. Application Data

(60) Provisional application No. 62/382,095, filed on Aug. 31, 2016.

(51) Int. Cl.
| | |
|---|---|
| B62D 21/09 | (2006.01) |
| B62D 21/02 | (2006.01) |
| B62D 33/04 | (2006.01) |
| B62D 25/20 | (2006.01) |
| B62D 27/02 | (2006.01) |
| B62D 27/06 | (2006.01) |
| B62D 29/04 | (2006.01) |

(52) U.S. Cl.
CPC .............. *B62D 21/09* (2013.01); *B62D 21/02* (2013.01); *B62D 25/2054* (2013.01); *B62D 27/026* (2013.01); *B62D 27/065* (2013.01); *B62D 29/043* (2013.01); *B62D 29/045* (2013.01); *B62D 33/04* (2013.01)

(58) Field of Classification Search
CPC ................ B62D 27/065; B62D 27/026; B62D 25/2054; B62D 29/043; B62D 29/045; B62D 21/09; B62D 21/02; B62D 33/04
USPC ........................................................ 296/184.1
See application file for complete search history.

(56) References Cited

U.S. PATENT DOCUMENTS

| | | | |
|---|---|---|---|
| 3,557,992 | A | 1/1971 | Reeves |
| 3,637,252 | A | 1/1972 | Metsker |
| 4,418,507 | A | 12/1983 | Roberts et al. |
| 4,685,720 | A | 8/1987 | Oren |
| 4,758,299 | A | 7/1988 | Burke |
| 4,976,490 | A | 12/1990 | Gentle |
| 5,403,063 | A | 4/1995 | Sjostedt et al. |
| 5,429,066 | A | 7/1995 | Lewit et al. |
| 5,507,405 | A | 4/1996 | Thomas |

(Continued)

FOREIGN PATENT DOCUMENTS

| | | |
|---|---|---|
| AU | 713260 | 11/1999 |
| CA | 1329818 | 5/1994 |

(Continued)

OTHER PUBLICATIONS

Black, Sara, "Structural adhesives, Part I: Industrial," CompositesWorld, posted Apr. 11, 2016, 7 pages.

(Continued)

*Primary Examiner* — Joseph D. Pape
*Assistant Examiner* — Dana D Ivey
(74) *Attorney, Agent, or Firm* — Faegre Baker Daniels LLP

(57) ABSTRACT

A mounting bracket is disclosed for coupling a composite floor of a cargo vehicle to a chassis of the cargo vehicle.

30 Claims, 8 Drawing Sheets

(56) References Cited

U.S. PATENT DOCUMENTS

| | | |
|---|---|---|
| 5,562,981 A | 10/1996 | Ehrlich |
| 5,664,518 A | 9/1997 | Lewit et al. |
| 5,700,118 A | 12/1997 | Bennett |
| 5,765,639 A | 6/1998 | Muth |
| 5,772,276 A | 6/1998 | Fetz et al. |
| 5,800,749 A | 9/1998 | Lewit et al. |
| 5,802,984 A | 9/1998 | Thoman |
| 5,830,308 A | 11/1998 | Reichard |
| 5,860,668 A | 1/1999 | Hull et al. |
| 5,860,693 A | 1/1999 | Ehrlich |
| 5,890,435 A | 4/1999 | Thoman |
| 5,897,818 A | 4/1999 | Lewit et al. |
| 5,908,591 A | 6/1999 | Lewit et al. |
| 5,916,093 A | 6/1999 | Fecko |
| 5,979,684 A | 11/1999 | Ohnishi |
| 5,992,117 A | 11/1999 | Schmidt |
| 6,004,492 A | 12/1999 | Lewit et al. |
| 6,013,213 A | 1/2000 | Lewit et al. |
| 6,076,693 A | 6/2000 | Reiter |
| 6,082,810 A | 7/2000 | Bennett |
| 6,092,472 A | 7/2000 | Thoman |
| 6,109,684 A * | 8/2000 | Reitnouer ............ B62D 33/02 280/795 |
| 6,199,939 B1 | 3/2001 | Ehrlich |
| 6,206,669 B1 | 3/2001 | Lewit et al. |
| 6,220,651 B1 | 4/2001 | Ehrlich |
| 6,227,125 B1 | 5/2001 | Schroeder |
| 6,247,747 B1 | 6/2001 | Kawanomoto |
| 6,318,794 B1 | 11/2001 | Berube |
| 6,349,988 B1 | 2/2002 | Foster |
| 6,374,546 B1 | 4/2002 | Fecko |
| 6,496,190 B1 | 12/2002 | Driemeyer et al. |
| 6,497,190 B1 | 12/2002 | Lewit |
| 6,505,883 B1 | 1/2003 | Ehrlich |
| 6,543,469 B2 | 4/2003 | Lewit et al. |
| 6,615,741 B2 | 9/2003 | Fecko |
| 6,626,622 B2 | 9/2003 | Zubko |
| 6,688,835 B1 | 2/2004 | Buher |
| 6,723,273 B2 | 4/2004 | Johnson et al. |
| 6,740,381 B2 | 5/2004 | Day et al. |
| 6,745,470 B2 | 6/2004 | Foster et al. |
| 6,755,998 B1 | 6/2004 | Reichard et al. |
| 6,761,840 B2 | 7/2004 | Fecko |
| 6,824,341 B2 | 11/2004 | Ehrlich |
| 6,843,525 B2 | 1/2005 | Preisler |
| 6,854,791 B1 | 2/2005 | Jaggi |
| 6,863,339 B2 | 3/2005 | Bohm |
| 6,869,561 B2 | 3/2005 | Johnson et al. |
| 6,877,940 B2 | 4/2005 | Nelson |
| 6,893,075 B2 | 5/2005 | Fenton et al. |
| 6,911,252 B2 | 6/2005 | Lewit et al. |
| 6,986,546 B2 | 1/2006 | Ehrlich |
| 7,000,978 B1 | 2/2006 | Messano |
| 7,025,166 B2 | 4/2006 | Thomas |
| 7,025,408 B2 | 4/2006 | Jones et al. |
| 7,069,702 B2 | 7/2006 | Ehrlich |
| 7,134,820 B2 | 11/2006 | Ehrlich |
| 7,182,396 B2 | 2/2007 | Taylor |
| 7,219,952 B2 | 5/2007 | Taylor |
| 7,264,305 B2 | 9/2007 | Kuriakose |
| 7,353,960 B2 | 4/2008 | Seiter |
| 7,407,216 B2 | 8/2008 | Taylor |
| 7,434,520 B2 | 10/2008 | Zupancich |
| 7,451,995 B2 | 11/2008 | Bloodworth et al. |
| 7,461,888 B2 | 12/2008 | Brown |
| 7,517,005 B2 | 4/2009 | Kuriakose |
| 7,575,264 B1 | 8/2009 | Solomon |
| 7,578,534 B2 | 8/2009 | Weariful, III |
| 7,578,541 B2 | 8/2009 | Layfield |
| 7,587,984 B2 | 9/2009 | Zupancich |
| 7,588,286 B2 | 9/2009 | Lewallen |
| 7,594,474 B2 | 9/2009 | Zupancich |
| 7,608,313 B2 | 10/2009 | Solomon |
| 7,621,589 B1 | 11/2009 | Gerome |
| 7,704,026 B2 | 4/2010 | Roush |
| 7,722,112 B2 | 5/2010 | Ehrlich |
| 7,748,172 B2 | 7/2010 | Zupancich |
| 7,762,618 B2 | 7/2010 | Lewallen |
| 7,770,928 B2 * | 8/2010 | Booher ............ B62D 21/20 280/789 |
| 7,790,076 B2 | 9/2010 | Seiter |
| 7,829,165 B2 | 11/2010 | Grandominico et al. |
| 7,887,120 B2 | 2/2011 | Bovine |
| 7,901,537 B2 | 3/2011 | Jones |
| 7,905,072 B2 | 3/2011 | Verhaeghe |
| 7,914,034 B2 | 3/2011 | Roush |
| 7,931,328 B2 | 4/2011 | Lewallen |
| 8,016,322 B2 | 9/2011 | Keehan |
| 8,056,960 B2 | 11/2011 | Brown |
| 8,186,747 B2 | 5/2012 | Bloodworth et al. |
| 8,263,217 B2 | 9/2012 | Verhaeghe |
| 8,342,588 B2 | 1/2013 | Skaradzinski |
| 8,448,989 B2 | 5/2013 | Verhaeghe |
| 8,474,871 B1 | 7/2013 | Ludwick |
| 8,696,048 B2 | 4/2014 | Griffin et al. |
| 8,757,704 B2 | 6/2014 | Zhao et al. |
| 8,814,255 B2 | 8/2014 | Yamaji et al. |
| 8,876,193 B2 | 11/2014 | Kunkel et al. |
| 8,950,144 B2 | 2/2015 | Padmanabhan |
| 9,051,014 B2 | 6/2015 | Lookebill et al. |
| 9,138,943 B2 | 9/2015 | Weinberg |
| 9,138,974 B2 | 9/2015 | Weinberg |
| 9,138,975 B2 | 9/2015 | Weinberg |
| 9,174,656 B2 | 11/2015 | Heitmeyer |
| 9,199,440 B2 | 12/2015 | Weinberg |
| 9,205,635 B2 | 12/2015 | Weinberg |
| 9,260,117 B2 | 2/2016 | Vande Sands |
| 9,339,987 B2 | 5/2016 | Weinberg |
| 9,371,468 B2 | 6/2016 | Lewit |
| 9,409,607 B2 | 8/2016 | Osten |
| 9,434,421 B1 | 9/2016 | Lu |
| 9,499,203 B1 | 11/2016 | Finley |
| 9,566,769 B2 | 2/2017 | Weinberg |
| 9,604,677 B2 | 3/2017 | McKinney |
| 9,650,003 B2 | 5/2017 | Owens |
| 9,708,009 B2 | 7/2017 | Vance |
| 9,738,050 B2 | 8/2017 | Lee |
| 9,744,753 B2 | 8/2017 | Sheffield |
| 9,815,501 B2 | 11/2017 | McCormack |
| 9,827,750 B2 | 11/2017 | Lookebill |
| 9,828,164 B2 | 11/2017 | Denson |
| 9,878,744 B2 | 1/2018 | Lu |
| 9,884,660 B2 | 2/2018 | Fenton |
| 9,884,661 B2 | 2/2018 | Fenton |
| 9,889,637 B2 | 2/2018 | Weinberg |
| 2001/0011832 A1 | 8/2001 | Ehrlich |
| 2005/0194381 A1 | 9/2005 | Zupancich |
| 2005/0241253 A1 | 11/2005 | Song et al. |
| 2006/0065152 A1 | 3/2006 | Heitmeyer |
| 2006/0108361 A1 | 5/2006 | Seiter |
| 2006/0121244 A1 | 6/2006 | Godwin |
| 2006/0123725 A1 | 6/2006 | Godwin |
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2007/0119850 A1 | 5/2007 | Seiter |
| 2007/0132278 A1 | 6/2007 | Lester et al. |
| 2007/0160793 A1 | 7/2007 | Cageao |
| 2007/0194602 A1 | 8/2007 | Ehrlich |
| 2007/0216197 A1 | 9/2007 | Wuerfel, III |
| 2007/0250025 A1 | 10/2007 | Sams |
| 2008/0290057 A1 | 11/2008 | Zupancich |
| 2009/0126600 A1 | 5/2009 | Zupancich |
| 2009/0278386 A1 | 11/2009 | Ehrlich |
| 2010/0101876 A1 | 4/2010 | Misencik |
| 2010/0109309 A1 | 5/2010 | Kootstra |
| 2011/0095574 A1 | 4/2011 | Brown |
| 2011/0204611 A1 | 8/2011 | Ziegler |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |

(56) References Cited

U.S. PATENT DOCUMENTS

| | | |
|---|---|---|
| 2015/0076861 A1 | 3/2015 | Padmanabhan |
| 2015/0137560 A1 | 5/2015 | Presiler |
| 2015/0158532 A1 | 6/2015 | Ayuzawa |
| 2015/0203160 A1 | 7/2015 | Peterson et al. |
| 2017/0057561 A1 | 3/2017 | Fenton |
| 2017/0166263 A1 | 6/2017 | McKinney |
| 2017/0210317 A1 | 7/2017 | Owens |
| 2017/0240216 A1 | 8/2017 | Bauer |
| 2017/0240217 A1 | 8/2017 | Storz |
| 2017/0241134 A1 | 8/2017 | McCloud |
| 2017/0247063 A1 | 8/2017 | Banerjee |
| 2017/0282499 A1 | 10/2017 | LaRocco |
| 2017/0334489 A1 | 11/2017 | Shin |
| 2018/0037151 A1 | 2/2018 | Bauer et al. |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2788047 | 8/2011 |
| CA | 2763094 | 7/2012 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor—trouble shooter-enthusiast!" presented at Florida Institute of Technology at least as early as 1999, 37 pages.

Lightweight Structures B.V., "ColdFeather: lightweight composite isothermal trailer," available online at http://www.lightweight-structures.com/coldfeather-lightweight-composite-isothermal-trailedindex.html at least as early as Jun. 18, 2015, 6 pages.

Expedition Portal, "Truck Camper Construction Costs?," available online at http://www.expeditionportal.com/forum/threads/12486-Truck-Camper-Construction-Costs at least as early as Jun. 18, 2015, 5 pages.

Griffiths, Bob, "Rudder Gets New Twist with Composites," CompositesWorld, posted Aug. 1, 2006, 4 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

Eric Green Associates.com, "Composite Rudders Take Shape for U.S. Navy" available online at http://www.ericgreeneassociates.com/images/Composite_Twisted_Rudder.pdf, accessed as early as Jul. 13, 2014, 7 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Scott Bader Group Companies, Crystic, "Composites Handbook", 100 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.

Johnson Truck Bodies, Blizzard Series brochure, accessed as early as Aug. 1, 2014, 8 pages.

International Trucking Shows, "True Composites Platform Highlight of International Trucking Show," Aug. 1992, 1 page.

Composite Twisted Rudder, TCC Meeting 2008, handout, 32 pages.

Composite Marine Control Surface, installed on USS Pioneer (MCM 9), May 1997, 13 pages.

Trailer/Body Builders, "More Emphasis on Less Weight," available at http://trailer-bodybuilders.com/trailers/more-emphasis-less-weight, May 1, 2008, 5 pages.

* cited by examiner

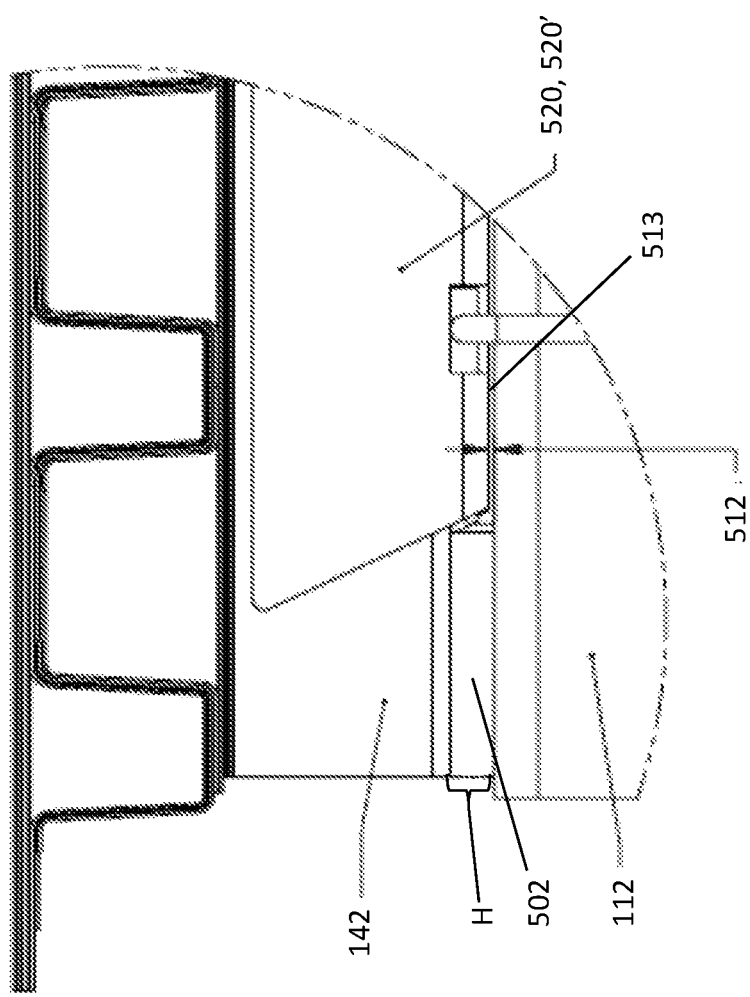

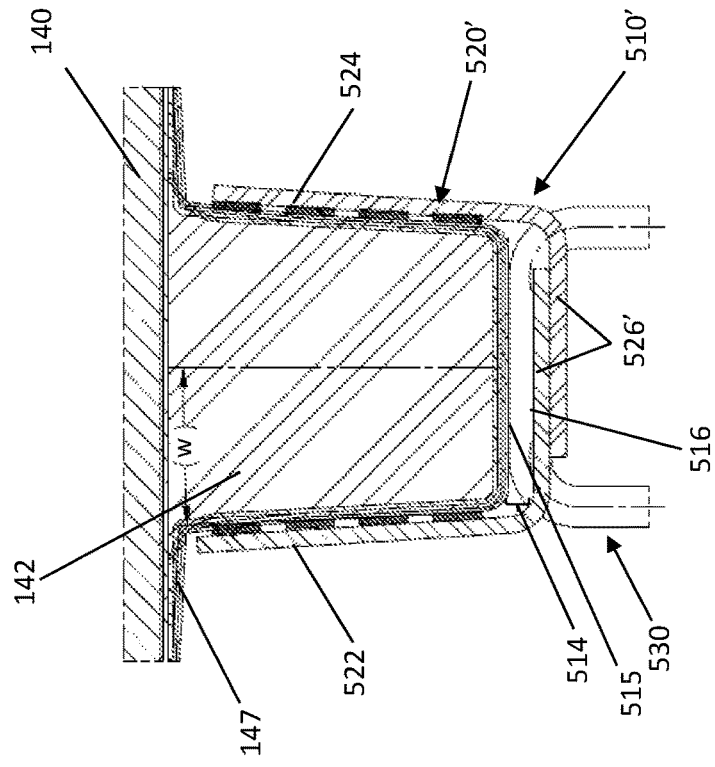
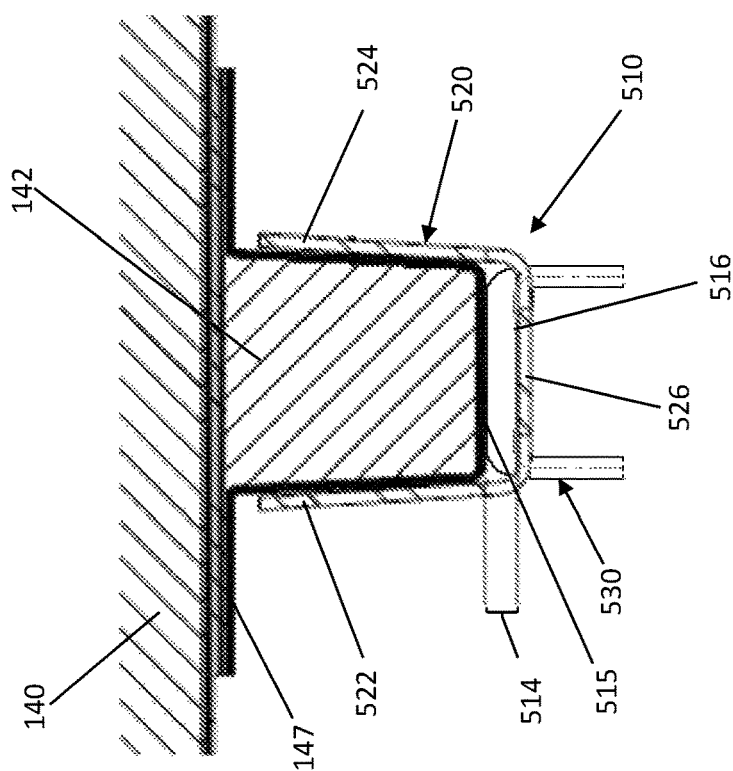

MOUNTING BRACKET FOR A COMPOSITE TRUCK BODY FLOOR

CROSS-REFERENCE TO RELATED APPLICATION

This application claims priority to U.S. Provisional Patent Application Ser. No. 62/382,095, filed Aug. 31, 2016, the disclosure of which is hereby expressly incorporated by reference herein in its entirety.

FIELD OF THE DISCLOSURE

The present disclosure relates generally to a mounting bracket for coupling a composite floor of a cargo vehicle to a chassis of the cargo vehicle.

BACKGROUND OF THE DISCLOSURE

Vehicles having cargo bodies are used in the transportation industry for transporting many different types of cargo. Certain cargo bodies may be refrigerated and insulated to transport temperature-sensitive cargo. The use of metal components within the floor, roof, sidewalls, and/or nose of the cargo body may contribute to heat loss from the interior of the cargo body and/or higher overall weight of the truck body. In order to reduce heat loss and the overall weight of the truck body, some cargo bodies are now being made of composite materials. However, coupling the composite materials to a chassis of the cargo vehicle has proven to be difficult, because present mounting apparatuses are generally relatively heavy and cumbersome to install. Thus, a need exists for a mounting apparatus for coupling the cargo body of a vehicle to the chassis of the vehicle that is lighter weight and easier to install.

SUMMARY OF THE DISCLOSURE

A mounting apparatus is disclosed for coupling a chassis rail of a cargo vehicle to a longitudinal composite support beam that extends from a lower surface of a composite floor of the cargo vehicle.

According to an exemplary embodiment of the present disclosure, a cargo vehicle comprising a chassis having at least one longitudinal rail coupled to a motorized truck, a cargo body coupled to the chassis and including a floor for supporting cargo, the floor of the cargo body having at least one longitudinal composite support beam that extends from a lower surface of the floor, and at least one mounting apparatus coupling the longitudinal rail of the chassis to the longitudinal composite support beam of the floor of the cargo body is disclosed. The mounting apparatus includes a support beam coupler adhesively bonded to the longitudinal composite support beam, at least one connector comprising a plurality of legs and coupled to the support beam coupler, at least a portion of the connector being positioned between a bottom surface of the longitudinal composite support beam and an inner surface of the support beam coupler, and a chassis rail bracket coupled to the at least one connector beneath the longitudinal rail of the chassis.

In certain embodiments, the support beam coupler comprises at least two flanges, a first of the at least two flanges being adhesively bonded to a first side surface of the longitudinal composite support beam and a second of the at least two flanges being adhesively bonded to a second side of the longitudinal composite support beam.

In certain embodiments, at least one spacer coupled to the longitudinal support beam creates a space between the longitudinal rail of the chassis and an outer surface of the support beam coupler.

In certain embodiments, the support beam coupler is a two-piece component comprising a first rounded L-shaped bracket and a second rounded L-shaped bracket.

In certain embodiments, the first rounded L-shaped bracket comprises an elongated cutout sized to receive one of the plurality of legs of the at least one connector, and the second rounded L-shaped bracket comprises a notch sized to receive another of the plurality of legs of the at least one connector.

In certain embodiments, the support beam coupler comprises a single substantially U-shaped bracket.

In certain embodiments, the single substantially U-shaped bracket includes a plurality of cutouts for receiving the plurality of legs of the at least one connector.

In certain embodiments, the at least one connector is a single U-bolt.

In certain embodiments, the longitudinal rail of the chassis is positioned vertically between an outer surface of the chassis rail bracket and an outer surface of the support beam coupler.

According to another exemplary embodiment of the present disclosure, a method for coupling a chassis rail of a vehicle to a longitudinal composite support beam that extends from a lower surface of a composite floor of a cargo body of the vehicle is disclosed. The method comprises coupling at least one connector to a support beam coupler, adhesively bonding the support beam coupler to the longitudinal composite support beam such that at least a portion of the at least one connector is positioned between an inner surface of the support beam coupler and a bottom surface of the composite support beam, positioning a chassis rail adjacent the support beam coupler and between legs of the at least one connector, and coupling a chassis rail bracket to the legs of the at least one connector using at least one coupler such that the chassis rail is coupled between the chassis rail bracket, the support beam coupler, and the legs of the at least one connector.

In certain embodiments, a space created by at least one spacer remains between the chassis rail and the support beam coupler after the chassis rail bracket is coupled to the legs of the at least one connector.

In certain embodiments, the support beam coupler comprises a first rounded L-shaped bracket and a second rounded L-shaped bracket.

In certain embodiments, the method further comprises welding the first rounded L-shaped bracket to the second rounded L-shaped bracket after the support beam coupler is bonded to the longitudinal composite support beam.

In certain embodiments, the support beam coupler comprises a single substantially U-shaped bracket.

In certain embodiments, coupling the at least one connector to the support beam coupler comprises positioning legs of the at least one connector within at least one cutout in the support beam coupler prior to bonding the support beam coupler to the support beam.

In certain embodiments, adhesively bonding the support beam coupler to the support beam comprises bonding the first rounded L-shaped bracket to the support beam, positioning at least a portion of the at least one connector between the first and second L-shaped brackets and the support beam, and bonding the second L-shaped bracket to the support beam.

In certain embodiments, the second L-shaped bracket is bonded to the support beam after the first rounded L-shaped bracket.

In certain embodiments, the first rounded L-shaped bracket is coupled to the support beam before the at least one connector is coupled between the first and second rounded L-shaped brackets and the support beam.

According to another exemplary embodiment of the present disclosure, a cargo vehicle comprising a chassis coupled to a motorized truck and having at least one longitudinal rail, a cargo body coupled to the chassis and including a floor for supporting cargo, the floor of the cargo body having at least one longitudinal composite support beam that extends from a lower surface of the floor, and at least one mounting apparatus coupling the longitudinal rail of the chassis to the longitudinal composite support beam is disclosed. The mounting apparatus comprises a support beam coupler adhesively bonded to the longitudinal support beam, at least one connector coupled to the support beam coupler, wherein at least a portion of the at least one connector is aligned vertically beneath the longitudinal support beam, and a chassis rail bracket coupled to the at least one connector beneath the longitudinal rail of the chassis.

In certain embodiments, at least one spacer coupled to the longitudinal support beam is configured to create a space between the longitudinal rail of the chassis and an outer surface of the support beam coupler.

In certain embodiments, at least a portion of the at least one connector is positioned between an inner surface of the support beam coupler and a bottom surface of the longitudinal support beam.

In certain embodiments, the at least one connector includes a plurality of vertical legs, wherein at least a portion of the plurality of vertical legs are aligned vertically beneath the longitudinal support beam.

According to another exemplary embodiment, a mounting apparatus for use with a cargo vehicle comprising a chassis having at least one longitudinal rail coupled to a motorized truck and a cargo body coupled to the chassis and including a floor for supporting cargo, the floor of the cargo body having at least one longitudinal composite support beam that extends from a lower surface of the floor is provided. The mounting apparatus is used to couple the longitudinal rail of the chassis to the longitudinal composite support beam of the floor of the cargo body. The mounting apparatus generally comprises a support beam coupler adhesively bonded to the longitudinal composite support beam, at least one connector comprising a plurality of legs and coupled to the support beam coupler, at least a portion of the connector being positioned between a bottom surface of the longitudinal composite support beam and an inner surface of the support beam coupler, and a chassis rail bracket coupled to the at least one connector beneath the longitudinal rail of the chassis.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 7 is a detailed side view of one of the mounting assemblies of FIG. 3 with chassis rails coupled to the support beams;

FIG. 8A is a cross-sectional view of one of the first mounting assemblies of FIG. 3; and FIG. 8B is a cross-sectional view of one of the second mounting assemblies of FIG. 3.

Figure 1:
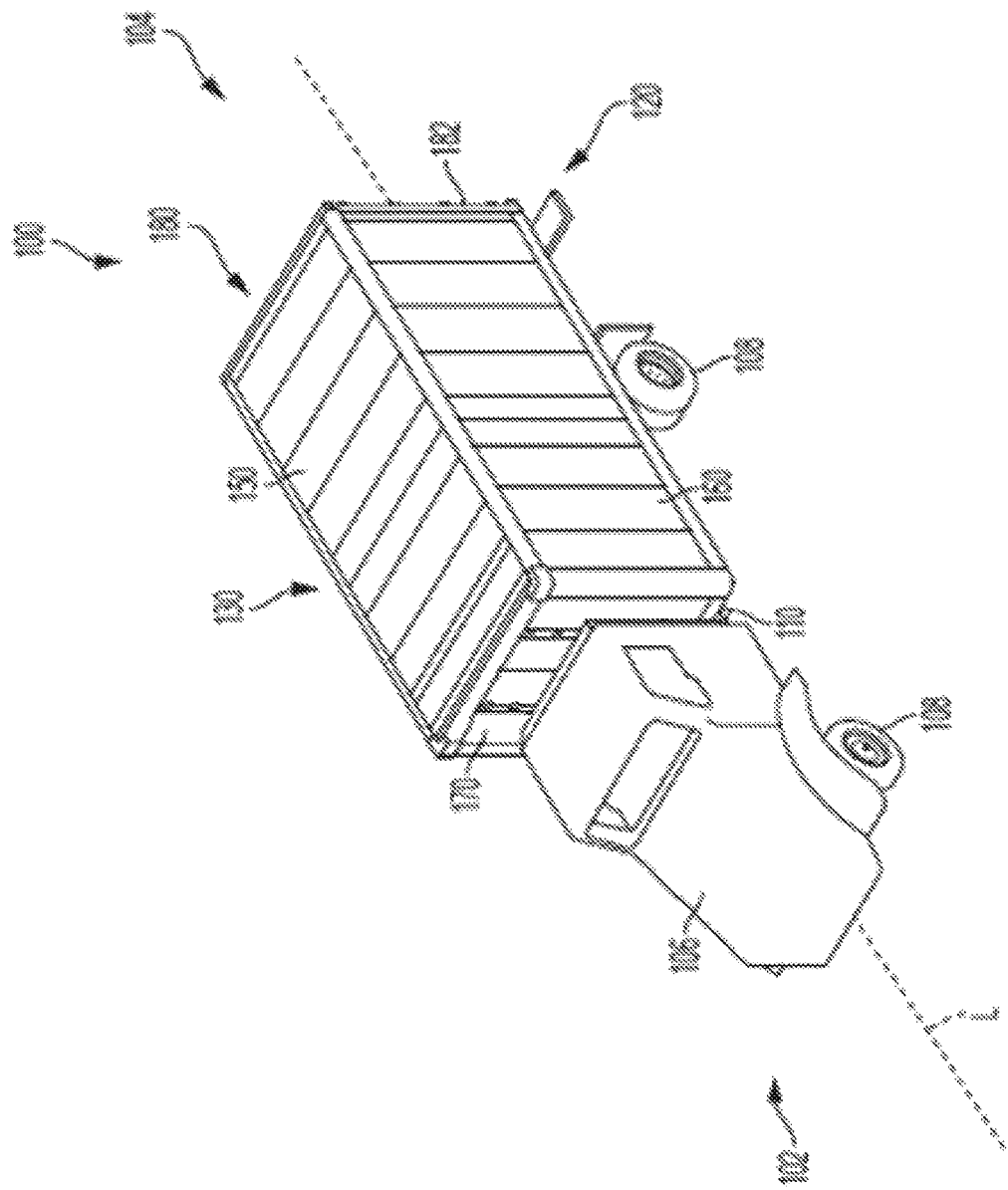
FIG. 1 is a perspective view of a cargo vehicle including a motorized truck, a chassis, a plurality of wheels, a bumper assembly, and a cargo body, the cargo body including a floor, a roof, a right sidewall, a left sidewall, a nose, and a rear door assembly having a rear frame.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Cargo Vehicle

Figure 2:
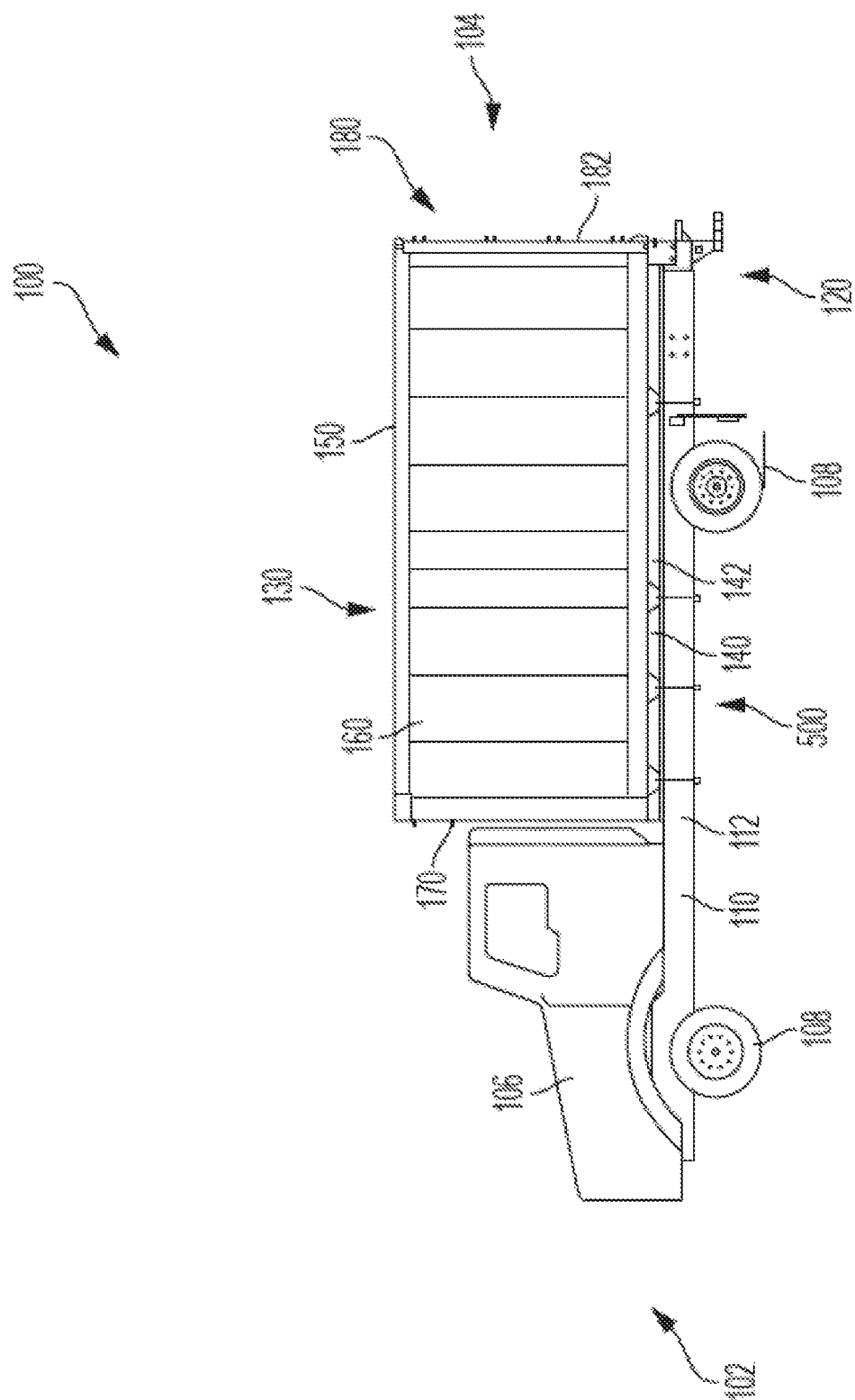
FIG. 2 is a side elevational view of the cargo vehicle of FIG. 1.
Figure 3:
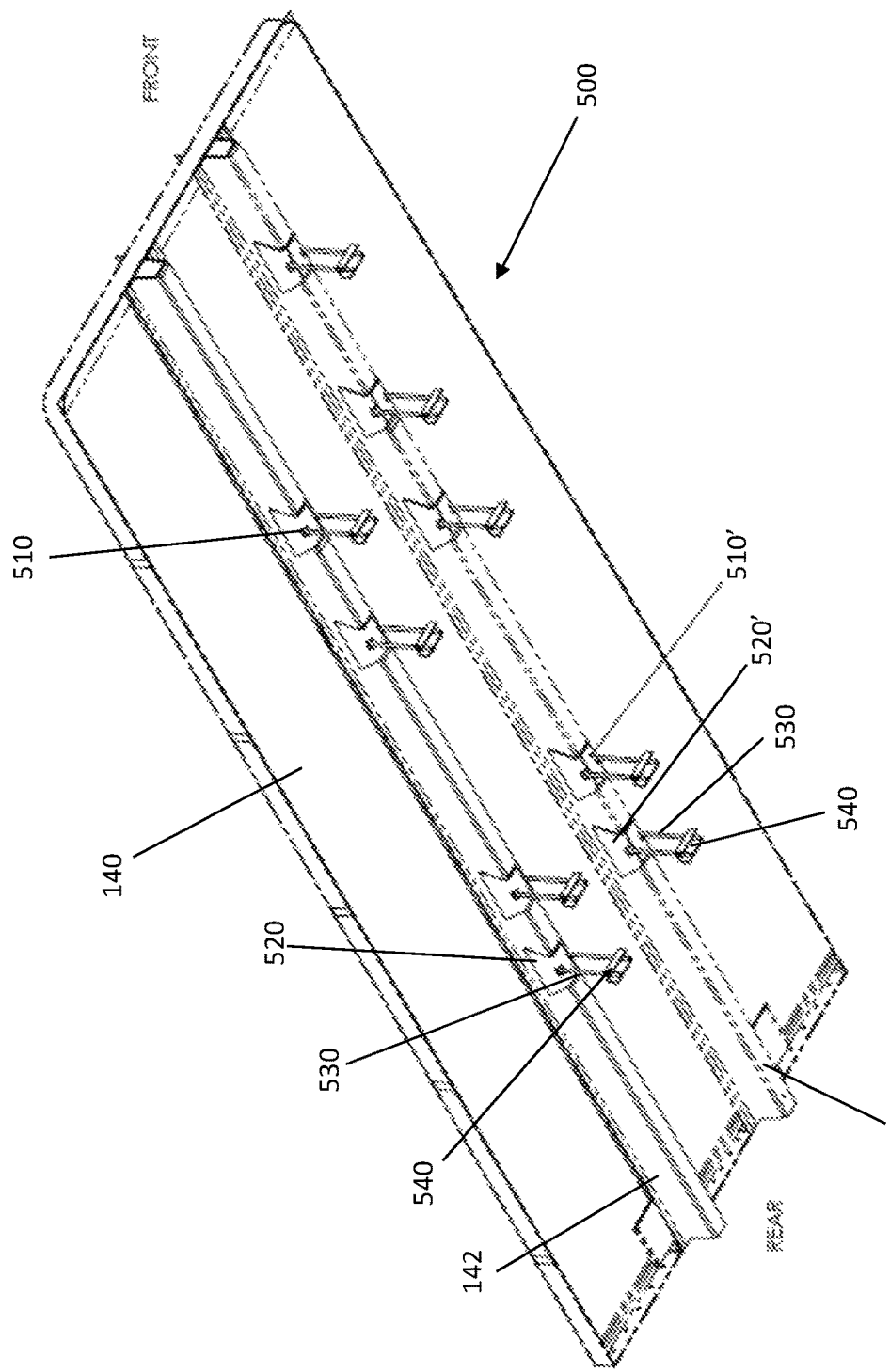
FIG. 3 is an assembled bottom perspective view of the floor of the cargo body of FIG. 1 with a first plurality of mounting assemblies of the present disclosure coupled to a first longitudinal support beam of the floor and a second plurality of mounting assemblies of the present disclosure coupled to a second longitudinal support beam of the floor.
Figure 4:
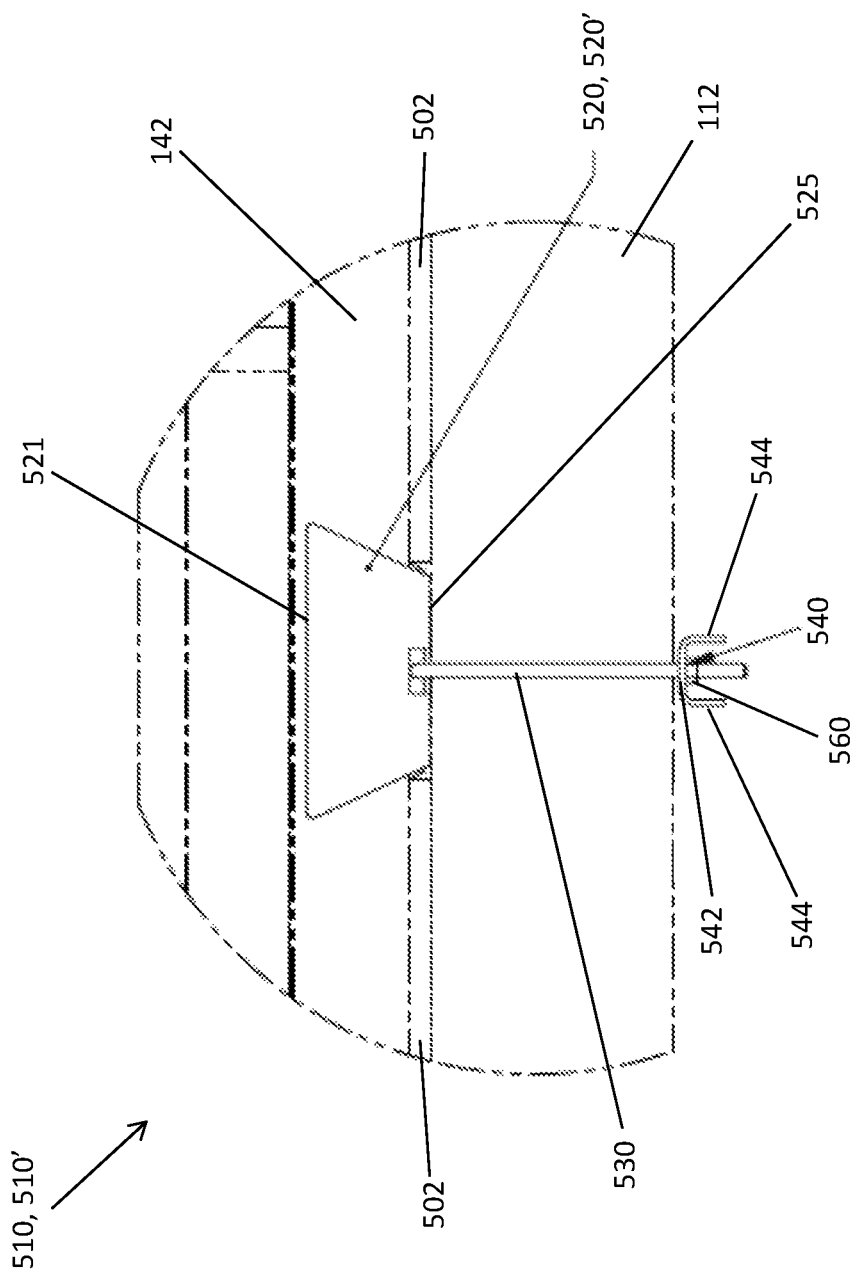
FIG. 4 is a side elevational view of one of the mounting assemblies of FIG. 3.

Referring initially to FIGS. 1 and 2, a cargo vehicle 100 is shown for supporting and transporting cargo. The illustrative straight frame vehicle 100 extends along a longitudinal axis L from a front end 102 to a rear end 104 and includes a motorized truck 106 that powers a plurality of wheels 108 or other traction devices. The illustrative vehicle 100 also includes a chassis 110 having right and left longitudinal rails 112. The illustrative vehicle 100 further includes a bumper assembly 120. The illustrative vehicle 100 still further includes a cargo body 130 including a floor 140 for supporting cargo, a roof 150, right and left sidewalls 160, a front wall or nose 170, and a rear door assembly 180 having a rear frame 182 and a door (not shown) to access the cargo body 130.

In the illustrated embodiment of FIGS. 1 and 2, cargo body 130 is an enclosed body that is supported atop chassis 110. Cargo body 130 may be refrigerated and/or insulated to transport temperature-sensitive cargo. While the concepts of this disclosure are described in relation to a refrigerated truck body, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

2. Composite Materials

The cargo body 130 may be constructed, at least in part, of composite materials. For example, the floor 140, roof 150, right and left sidewalls 160, and/or nose 170 of the cargo body 130 may be constructed of composite materials. As such, the cargo body 130, as well as the floor 140, roof 150, right and left sidewalls 160, and/or nose 170 of the cargo body 130, may be referred to herein as composite structures. These composite structures may lack internal metal components. Also, each composite structure may be a single, unitary component, which may be formed from a plurality of layers permanently coupled together. Other elements of the cargo body 130 may be constructed of non-composite (e.g., metallic) materials. For example, the rear frame 182 of the cargo body 130 may be constructed of metallic materials.

The composite construction of the cargo body 130 may present certain advantages. First, because the composite structures may lack internal metal components, the composite cargo body 130 may have a reduced heat loss coefficient (Ua) and improved thermal efficiency. Also, the composite cargo body 130 may operate to minimize outgassing of blowing agents, minimize air loss, and minimize water intrusion. Additionally, the composite cargo body 130 may be lighter in weight than a typical metallic cargo body, which may improve fuel efficiency. Further, the composite cargo body 130 may have fewer metallic structures than a typical cargo body, which may make the cargo body 130 less susceptible to corrosion. Also, the composite cargo body 130 may include fewer parts than a typical metallic cargo body, which may simplify construction, reduce inventory, and reduce variation in manufacturing. Further, the composite cargo body 130 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 130 may qualify as "food grade" equipment.

Composite materials are generally formed by combining two or more different constituents that remain separate and distinct in the final composite material. Exemplary composite materials include fiber-reinforced plastics (FRP), for example carbon-fiber-reinforced plastics (CRP). Such materials may be formed from an extruded preform assembly of a woven or stitched fiberglass cloth, a non-woven spun bond polymeric material, and a foam core (not shown). These preforms may be cut to size, combined in a mold resembling the final shape with other fiberglass and resin layers, and wetted with at least one resin and optionally a catalyst to define a single structure during a curing process. The spun bond polymeric material may be mechanically stitched to the fiberglass cloth and/or the foam before the preforms are wetted with resin. In one embodiment, the spun bond material may be a polyester material, the foam may be a polyurethane material, and the resin may be a thermoset plastic resin matrix. An exemplary resin is the co-cure resin disclosed in U.S. Pat. No. 9,371,468, which is incorporated by reference in its entirety herein.

The individual preforms may be sized, shaped, and arranged in a manner that accommodates the strength requirements of the final structure. In areas of the final structure requiring less strength, the preforms may be relatively large in size, with the foam cores spanning relatively large distances before reaching the surrounding fiberglass and polymeric skins. By contrast, in areas of the final structure requiring more strength, the preforms may be relatively small in size, with the foam cores spanning relatively small distances before reaching the surrounding fiberglass and polymeric skins. For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include DuraPlate® structures provided by Wabash National Corporation of Lafayette, Ind. and PRISMA® structures provided by Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468 and U.S. Patent Application Publication No. 2014/0262011.

3. Adhesive Bonding

Various connections or joints of the composite cargo body 130 may be assembled, at least in part, using adhesive bonding. The adhesive may be a structural adhesive that is suitable for load-bearing applications. The adhesive may have a lap shear strength greater than 1 MPa, 10 MPa, or more, for example. Exemplary adhesives include, for example, epoxies, acrylics, urethanes (single and two part), polyurethanes, methyl methacrylates (MMA), cyanoacrylates, anaerobics, phenolics, and/or vinyl acetates. The adhesive may be selected based on the needs of the particular application.

The method used to form an adhesive bond may also vary according to the needs of the particular application. First, the surfaces receiving the adhesive (i.e., adherends) may be pre-treated, such as by abrading the surfaces, applying a primer, and/or cleaning the surfaces with a suitable cleaner (e.g., denatured alcohol). Second, the adhesive may be applied to the surfaces over a predetermined application time (i.e., "open" time) and at a predetermined application temperature. In certain embodiments, the application temperature may be below the glass-transition temperature of the adhesive. Third, pressure may be applied to the surfaces, such as by using clamps, weights, vacuum bags, and/or ratchet straps, for example. Finally, the adhesive may be allowed to solidify. Some adhesives may undergo a chemical reaction in order to solidify, referred to as curing. This curing may occur over a predetermined cure time and at a predetermined cure temperature. In certain embodiments, the adhesive may be heated during curing such that the cure temperature is higher than the application temperature.

Using adhesive bonding to assemble the composite cargo body 130 rather than mechanical fasteners may present certain advantages. First, the composite structures may not require holes for mechanical fasteners, so the structural integrity of the composite structures may be maintained. Also, the adhesive bond may be stronger than a connection using mechanical fasteners. In fact, the strength of the adhesive bond may exceed the strength of the composite structures themselves, so the composite structures may delaminate or otherwise fail before the adhesive fails. Further, the elimination of mechanical fasteners may also provide improved aesthetics. Finally, the adhesive may form a seal between the adherends, which may help fill intentional or unintentional spaces between the adherends and insulate the cargo body 130.

4. Connectors

Various connections of the composite cargo body 130 may be assembled using one or more connectors, which may include brackets, braces, plates, and combinations thereof, for example. The connectors may vary in size and shape. For example, suitable connectors may be L-shaped, C-shaped, T-shaped, pi-shaped, flat, or bent.

The connectors may be constructed of metallic materials (e.g., aluminum, titanium, or steel), polymeric materials, wood, or composite materials. In certain embodiments, the connectors are constructed of materials which are dissimilar from the composite material used to construct the composite cargo body 130. The connectors may be fabricated by extrusion, pultrusion, sheet forming and welding, roll forming, and/or casting, for example.

The connectors may be adhesively bonded to composite structures of the cargo body 130. For example, the connectors may be adhesively bonded to the composite floor 140, the composite roof 150, the composite right and left sidewalls 150, and/or the composite nose 170 of the cargo body 130. The connectors may be mechanically fastened to non-composite (e.g., metallic) structures of the cargo body 130. For example, the connectors may be mechanically fastened to the metallic rear frame 182 of the cargo body 130. Suitable mechanical fasteners include bolts, rivets, and screws, for example.

5. Connection Between Composite Floor and Metallic Chassis

Figure 5:
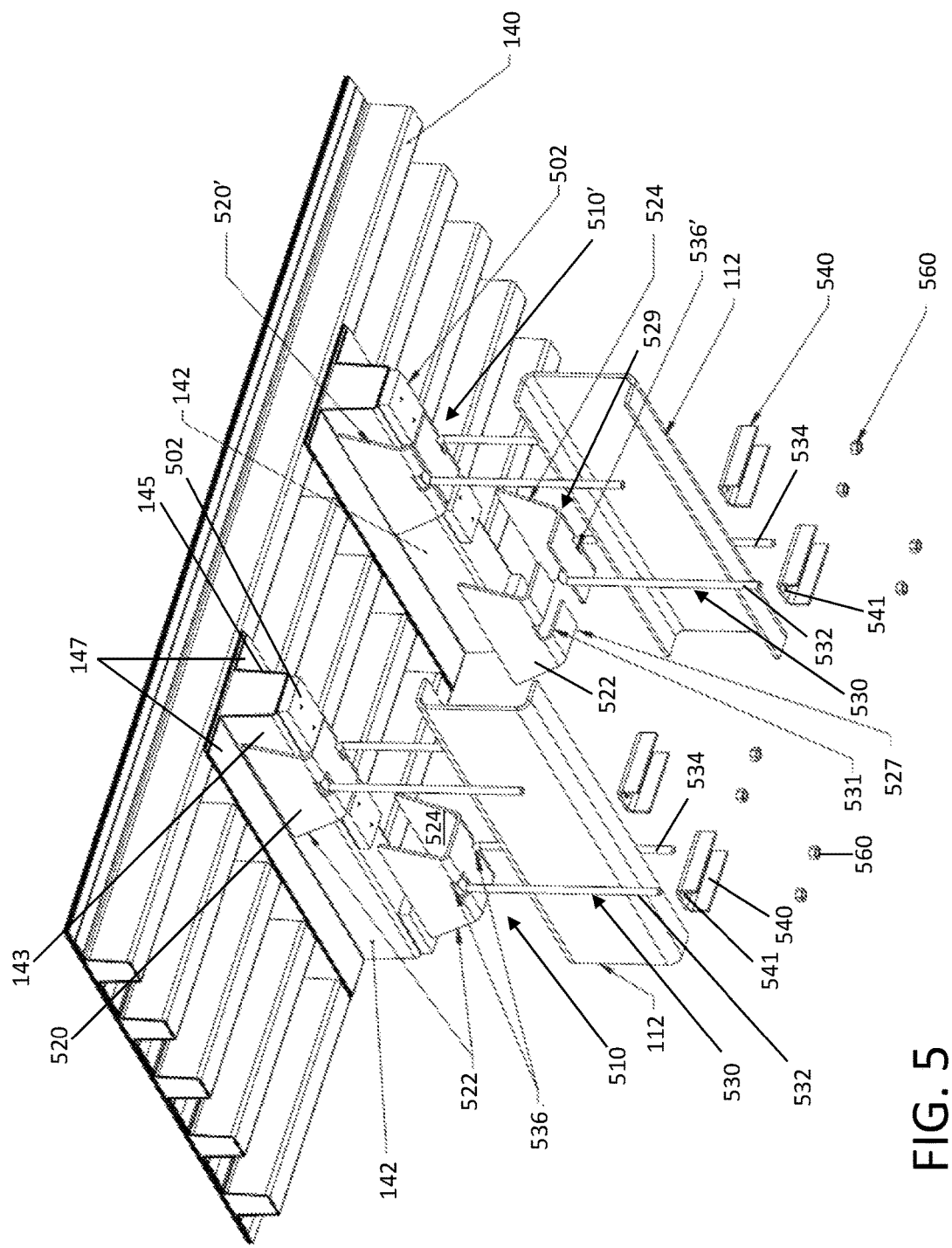
FIG. 5 is an exploded bottom perspective view of two of the first mounting assemblies of FIG. 3 and two of the second mounting assemblies of FIG. 3, along with the chassis rails of the vehicle.

Referring next to FIGS. 2-8, a connection 500 is shown between the composite floor 140 of the cargo body 130 and the metallic chassis 110 of the straight frame vehicle 100. The composite floor 140 of the cargo body 130 includes an upper surface 144 for supporting cargo, a lower surface 146, and right and left longitudinal support beams 142 extending downwardly from the lower surface 146. The support beams 142 may be composite structures that are relatively narrow and/or reinforced for additional strength, as discussed in Section 2 above. Together with the support beams 142, the composite floor 140 of the cargo body 130 is generally T-shaped in cross-section at each support beam 142 (FIGS. 8A and 8B). The chassis 110 includes corresponding right and left longitudinal rails 112, which may be metallic structures that are generally C-shaped in cross-section (FIG. 5). At least one spacer 502 may be provided between the corresponding support beam 142 of the composite floor 140 and the corresponding rail 112 of the chassis 110. In one embodiment, each spacer 502 may be a single-piece component with a notch 504 formed therein to receive another component. In another embodiment, each spacer 502 may be a multi-piece component with the notch 504 defined between adjacent pieces of spacer 502.

A plurality of first mounting assemblies 510 are provided along the length of vehicle 100 (FIG. 2) to form the connection 500 between the composite support beams 142 of the composite floor 140 and the corresponding rails 112 of the chassis 110. Advantageously, the mounting assemblies 510 may reduce shear loads between the mounting assemblies 510 and the composite support beams 142.

As shown in FIGS. 3-5 and 7-8A, each mounting assembly 510 illustratively includes a support beam coupler 520, at least one connector 530, and a chassis rail bracket 540. Each of the illustrative support beam couplers 520 is generally U-shaped in cross-section (FIGS. 5 and 8), having a first vertical flange 522, a second vertical flange 524, and a horizontal connecting member 526 coupling first vertical flange 522 and second vertical flange 524. From the side view of FIG. 4, flanges 522, 524 of support beam coupler 520 may narrow downwardly, such that the lower edge 525 of flanges 522, 524 of the support beam coupler 520 and connecting member 526 are shorter than the upper edge 521 of flanges 522, 524 of the support beam coupler 520. In other embodiments, connecting member 526, lower edge 525, and upper edge 521 of support beam coupler 520 may be of equal length. Also, from the end view of FIG. 8A, flanges 522, 524 of support beam coupler 520 may narrow downwardly, such that the lower edges 525 of flanges 522, 524 of the support beam coupler 520 are closer together than the upper edges 521 of flanges 522, 524 of the support beam coupler 520. In this arrangement, support beam coupler 520 may accommodate longitudinal support beams 142 that narrow downwardly in a similar manner.

Still referring to FIGS. 3-5 and 7-8A, the illustrative connector 530 is generally U-shaped, having a first vertical leg 532, a second vertical leg 534, and a horizontal connecting leg 538 therebetween, as discussed further below. In various embodiments, at least a portion of connector 530 is positioned vertically beneath support beam 142. More specifically, at least a portion of horizontal connecting leg 538 and/or vertical legs 534 may be positioned vertically beneath support beam 142. In the illustrated embodiment of FIG. 8A, the entire connector 530, including horizontal connecting leg 538 and both vertical legs 534, is positioned vertically beneath the outer profile of support beam 142 and support beam coupler 520 without extending laterally beyond the outer profile of support beam 142 and support beam coupler 520. Thus, the illustrative connector 530 of FIG. 8A is a compact or low-profile component that may allow other vehicle components (e.g., lifts, ramps) to be mounted laterally of support beam 142. Also, the illustrative chassis rail bracket 540 is generally C-shaped in cross-section, having a horizontal portion 542 and upper and lower vertical portions 544. However, as discussed in Section 4 above, the support beam coupler 520, connector 530, and chassis rail bracket 540 may vary in size and shape. Each mounting assembly 510 further includes fasteners 560, illustratively nuts, for clamping the mounting assembly 510 together.

In various embodiments, support beam coupler 520 of mounting assembly 510 may be a single U-shaped bracket. To assemble mounting assembly 510, support beam coupler 520 and connector 530 may be assembled such that legs 532, 534 of connector 530 are positioned within apertures or cutouts 536 in support beam coupler 520. Then, flanges 522, 524 of support beam coupler 520 may be adhesively bonded to the composite support beam 142 of the composite floor 140 such that the horizontal connecting leg 538 of the connector 530 is positioned between support beam 142 and support beam coupler 520. Specifically, one of the flanges 522, 524 of the support beam coupler 520 may be adhesively bonded to a first side 143 of the composite support beam 142 of the composite floor 140 using adhesive, and the other of the flanges 522, 524 of the support beam coupler 520 may be adhesively bonded to a second side 145 of the composite support beam 142 of the composite floor 140 using adhesive. In various embodiments, flanges 522, 524 are configured such that they do not abut horizontal portions 147 of support beams 142 in order to prevent a stress riser from being created by their abutment. Next, the composite support beam 142 of the composite floor 140 may be lowered onto the corresponding rail 112 of the chassis 110. In various embodiments, connector 530 is coupled to the support beam coupler 520 in a manner that resists vertical movement, but accommodates some longitudinal shifting to fit over the chassis rail. At any point prior to support beam 142 being lowered onto rail 112, spacer(s) 502 may be coupled to support beams 142 with the connecting member 526 of support beam coupler 520 sized and shaped to fit in notch 504. As indicated above, notch 504 may be formed within a single spacer 502 or between two adjacent pieces of spacers 502. Then, chassis rail bracket 540 may be coupled to connector 530 beneath chassis rail 112 and the mounting assembly 510 may be clamped together by coupling fasteners 560 to legs 532, 534 of connector 530, which may be inserted through aligned holes 541 in chassis rail bracket 540. When each of the mounting assemblies 510 are clamped together in this manner, connection 500 is formed between the composite floor 140 of the cargo body 130 and the metallic chassis 110 of the straight frame vehicle 100. This connection 500 prevents the cargo body 130 from sliding off the chassis 110 when vehicle 100 is stopping, traveling, or parking on a hill, for example. This connection 500 also prevents the cargo body 130 from shifting side-to-side relative to the chassis 110 when vehicle 100 is turning, for example.

A plurality of second mounting assemblies 510' are shown in FIGS. 3, 5-7, and 8B. The second mounting assemblies 510' are similar to the first mounting assemblies 510 described above, with like reference numerals identifying like elements, except as described below. Unlike the one-piece support beam coupler 520 of the first mounting assembly 510, support beam coupler 520' of the second mounting assembly 510' may be a multi-piece component having two rounded L-shaped brackets 527, 529. Each of the two rounded L-shaped brackets 527, 529 comprises a first vertical leg 528 and a second horizontal leg 528'. The first vertical legs 528 of L-shaped brackets 527, 529 correspond to the vertical flanges 522, 524 of the support beam coupler 520', while the second horizontal legs 528' of L-shaped brackets 527, 529 correspond to the horizontal connecting member 526' of the support beam coupler 520'. In various embodiments, one of the two rounded L-shaped brackets 527, 529 comprises a cutout 536', and the other of two rounded L-shaped brackets 527, 529 comprises an elongate notch 531. Cutout 536' is configured to receive one leg of connector 530, and notch 531 is configured to create a second cutout 536', when the two L-shaped brackets 527, 529 are assembled together.

To assemble mounting assembly 510', the first L-shaped bracket 527 is adhesively bonded to support beam 142 leaving a space 514 with a width substantially equal to a width of connector 530. Next, connector 530 is assembled with second L-shaped bracket 529 by positioning one of legs 532, 534 in cutout 536' of the second L-shaped bracket 529. Then, support beam coupler 520' is assembled by overlapping second leg 528' of the second L-shaped bracket 529 with second leg 528' of the first L-shaped bracket 527, positioning the other of legs 532, 534 in cutout 536' created by notch 531 and the assembly of the first and second L-shaped brackets 527, 529, positioning horizontal connecting leg 538 of connector 530 within space 514, and adhesively bonding the second L-shaped bracket 529 to support beam 142. In various embodiments, flanges 522, 524 are configured such that they do not abut horizontal portions 147 of support beams 142 in order to prevent a stress riser from being created by their abutment. Once first and second L-shaped brackets 527, 529 are bonded to support beam 142, brackets 527, 529 may be coupled together by way of bead welding. Next, the composite support beam 142 of the composite floor 140 may be lowered onto the corresponding rail 112 of the chassis 110. At any point prior to support beam 142 being lowered onto rail 112, spacer(s) 502 may be coupled to support beams 142. The two-piece connecting member 526' of support beam coupler 520', comprising overlapping second legs 528' of first L-shaped bracket 527 and second L-shaped bracket 529, may be sized and shaped to fit in notch 504. As indicated above, notch 504 may be formed within a single spacer 502 or between two adjacent pieces of spacers 502. Then, chassis rail bracket 540 may be coupled to connector 530 adjacent chassis rail 112 and the mounting assembly 510' may be clamped together by coupling fasteners 560 to legs 532, 534 of connector 530, which may be inserted through aligned holes 541 in chassis rail bracket 540. When mounting assembly 510' is clamped together in this manner, connection 500 is formed between the composite floor 140 of the cargo body 130 and the metallic chassis 110 of the straight frame vehicle 100. This connection 500 prevents the cargo body 130 from sliding off the chassis 110 when vehicle 100 is stopping, traveling, or parking on a hill, for example. This connection 500 also prevents the cargo body 130 from shifting side-to-side relative to the chassis 110 when vehicle 100 is turning, for example.

In various embodiments, connection 500 may include at least one of each mounting assemblies 510 and 510'. In other embodiment, connection 500 may include only a single type of mounting assembly 510 or 510'.

Figure 6:
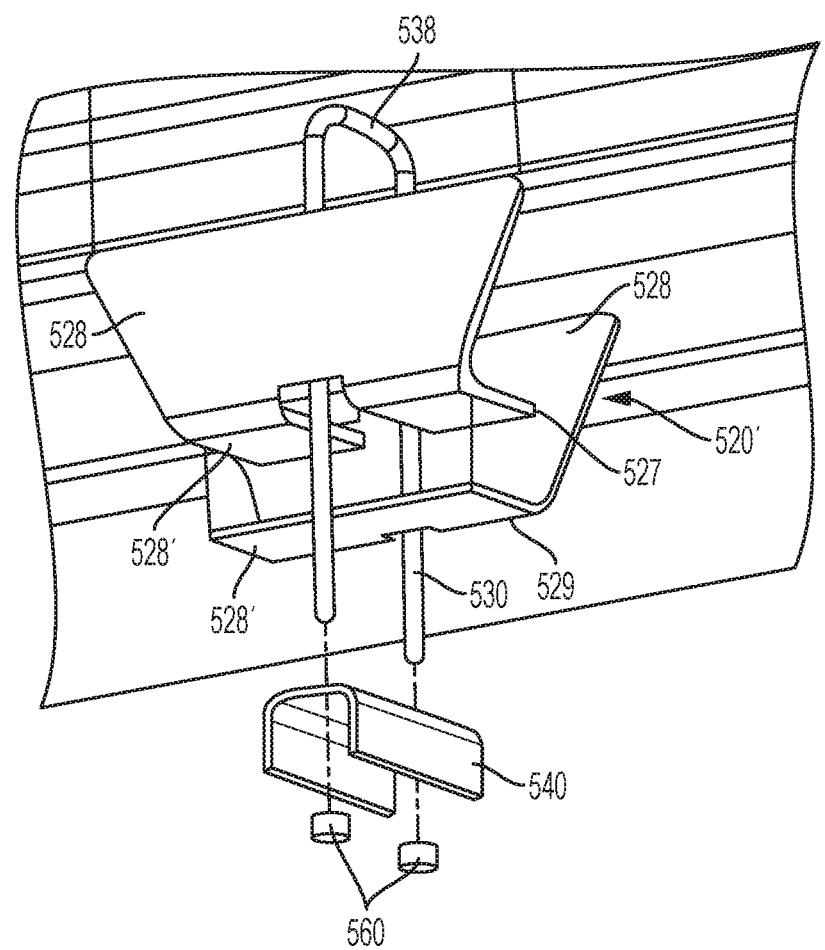
FIG. 6 is an exploded perspective view of one of the second mounting assemblies of FIG. 3.

Connector 530 may be used interchangeably with first mounting apparatuses 510 and second mounting apparatuses 510'. As shown in FIG. 6, connector 530 may comprise a single U-shaped bolt comprising both vertical legs 532, 534 and an integral horizontal leg 536. In other various embodiments, connector 530 is a multi-piece component comprising two J-shaped bolts, one including leg 532 and the other including leg 534. When connector 530 comprises two J-shaped bolts, connector 530 may be coupled to support beam coupler 520, 520' before or after support beam coupler 520, 520' is bonded to support beam 142.

With reference to FIG. 7, mounting assembly 510, 510' is configured such that a space 512 remains between a lower outer surface 513 of support beam coupler 520, 520' and chassis rail 112 when assembled. Space 512 is created by spacer 502 having a height H that extends further away from the longitudinal support beam 142 than the outer surface 513 of support beam coupler 532. Space 512 allows frictional forces to be more evenly distributed along spacers 502, which provides for an improved grip between the floor 140 of the cargo body 130 and the chassis rail 112. In various embodiments, if enough torque is applied, the space 512 may go to zero, which means that the support beam coupler 520, 520' will be in contact with the chassis rail 112 limiting the amount of shear that will be generated between the support beam coupler 520, 520' and the surface of the support beam 142. In various embodiments, a spacer similar to spacer 502 may be placed between the bottom of support beam coupler 520, 520' and the chassis rail 112, if the space 512 is too large and still remains after proper torque has been applied. The spacer may be metallic or non-metallic in nature.

In addition, and referring to FIGS. 8A and 8B, mounting assembly 510, 510' is configured such that a space 514 remains between a lower outer surface 515 of support beam 142 and an upper inner surface 516 of support beam coupler 520, 520' that accommodates the width and the height of connector 530 when assembled. Space 514 allows for at least a portion of connector 530 to be positioned between the outer surface 515 of support beam 142 and the inner surface 516 of support beam coupler 532.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo vehicle comprising:
    a chassis having at least one longitudinal rail coupled to a motorized truck;
    a cargo body coupled to the chassis and including a floor for supporting cargo, the floor of the cargo body having at least one longitudinal composite support beam that extends from a lower surface of the floor; and
    at least one mounting apparatus coupling the longitudinal rail of the chassis to the longitudinal composite support beam of the floor of the cargo body, the mounting apparatus comprising:
        a support beam coupler adhesively bonded to the longitudinal composite support beam;
        at least one connector comprising a plurality of legs and coupled to the support beam coupler, at least a portion of the connector being positioned between a bottom surface of the longitudinal composite support beam and an inner surface of the support beam coupler; and
        a chassis rail bracket coupled to the at least one connector beneath the longitudinal rail of the chassis.

2. The cargo vehicle of claim 1, wherein the support beam coupler comprises at least two flanges, a first of the at least two flanges being adhesively bonded to a first side surface of the longitudinal composite support beam and a second of the at least two flanges being adhesively bonded to a second side of the longitudinal composite support beam.

3. The cargo vehicle of claim 1, wherein at least one spacer coupled to the longitudinal support beam creates a space between the longitudinal rail of the chassis and an outer surface of the support beam coupler.

4. The cargo vehicle of claim 1, wherein the support beam coupler is a two-piece component comprising a first rounded L-shaped bracket and a second rounded L-shaped bracket.

5. The cargo vehicle of claim 4, wherein the first rounded L-shaped bracket comprises an elongate cutout sized to receive one of the plurality of legs of the at least one connector, and the second rounded L-shaped bracket comprises a notch sized to receive another of the plurality of legs of the at least one connector.

6. The cargo vehicle of claim 1, wherein the support beam coupler comprises a single substantially U-shaped bracket.

7. The cargo vehicle of claim 6, wherein the single substantially U-shaped bracket includes a plurality of cutouts for receiving the plurality of legs of the at least one connector.

8. The cargo vehicle of claim 1, wherein the at least one connector is a single U-bolt.

9. The cargo vehicle of claim 1, wherein the longitudinal rail of the chassis is positioned vertically between an outer surface of the chassis rail bracket and an outer surface of the support beam coupler.

10. A method for coupling a chassis rail of a vehicle to a longitudinal composite support beam that extends from a lower surface of a composite floor of a cargo body of the vehicle comprising:
    coupling at least one connector to a support beam coupler;
    adhesively bonding the support beam coupler to the longitudinal composite support beam such that at least a portion of the at least one connector is positioned between an inner surface of the support beam coupler and a bottom surface of the composite support beam;
    positioning a chassis rail adjacent the support beam coupler and between legs of the at least one connector; and
    coupling a chassis rail bracket to the legs of the at least one connector using at least one coupler such that the chassis rail is coupled between the chassis rail bracket, the support beam coupler, and the legs of the at least one connector.

11. The method of claim 10, wherein a space created by at least one spacer remains between the chassis rail and the support beam coupler after the chassis rail bracket is coupled to the legs of the at least one connector.

12. The method of claim 10, wherein the support beam coupler comprises a first rounded L-shaped bracket and a second rounded L-shaped bracket.

13. The method of claim 12 further comprising welding the first rounded L-shaped bracket to the second rounded L-shaped bracket after the support beam coupler is bonded to the longitudinal composite support beam.

14. The method of claim 10, wherein the support beam coupler comprises a single substantially U-shaped bracket.

15. The method of claim 10, wherein coupling the at least one connector to the support beam coupler comprises positioning legs of the at least one connector within at least one cutout in the support beam coupler prior to bonding the support beam coupler to the support beam.

16. The method of claim 12, wherein adhesively bonding the support beam coupler to the support beam comprises bonding the first rounded L-shaped bracket to the support beam, positioning at least a portion of the at least one connector between the first and second L-shaped brackets and the support beam, and bonding the second L-shaped bracket to the support beam.

17. The method of claim 16, wherein the second L-shaped bracket is bonded to the support beam after the first rounded L-shaped bracket.

18. The method of claim 17, wherein the first rounded L-shaped bracket is coupled to the support beam before the at least one connector is coupled between the first and second rounded L-shaped brackets and the support beam.

19. A cargo vehicle comprising:
   a chassis coupled to a motorized truck and having at least one longitudinal rail;
   a cargo body coupled to the chassis and including a floor for supporting cargo, the floor of the cargo body having at least one longitudinal composite support beam that extends from a lower surface of the floor; and
   at least one mounting apparatus coupling the longitudinal rail of the chassis to the longitudinal composite support beam, the mounting apparatus comprising:
      a support beam coupler adhesively bonded to the longitudinal support beam;
      at least one connector coupled to the support beam coupler, wherein at least a portion of the at least one connector is aligned vertically beneath the longitudinal support beam; and
      a chassis rail bracket coupled to the at least one connector beneath the longitudinal rail of the chassis.

20. The cargo vehicle of claim 19, wherein at least one spacer coupled to the longitudinal support beam is configured to create a space between the longitudinal rail of the chassis and an outer surface of the support beam coupler.

21. The cargo vehicle of claim 19, wherein at least a portion of the at least one connector is positioned between an inner surface of the support beam coupler and a bottom surface of the longitudinal support beam.

22. The cargo vehicle of claim 19, wherein the at least one connector includes a plurality of vertical legs, wherein the plurality of vertical legs are aligned vertically beneath an outer profile of the longitudinal support beam and the support beam coupler.

23. A mounting apparatus for use with a cargo vehicle comprising a chassis having at least one longitudinal rail coupled to a motorized truck and a cargo body coupled to the chassis and including a floor for supporting cargo, the floor of the cargo body having at least one longitudinal composite support beam that extends from a lower surface of the floor, the mounting apparatus coupling the longitudinal rail of the chassis to the longitudinal composite support beam of the floor of the cargo body, the mounting apparatus comprising:
   a support beam coupler adhesively bonded to the longitudinal composite support beam;
   at least one connector comprising a plurality of legs and coupled to the support beam coupler, at least a portion of the connector being positioned between a bottom surface of the longitudinal composite support beam and an inner surface of the support beam coupler; and
   a chassis rail bracket coupled to the at least one connector beneath the longitudinal rail of the chassis.

24. A cargo vehicle with at least one longitudinal rail coupled to a motorized truck, the cargo vehicle comprising:
   a cargo body coupled to a chassis and including a floor for supporting cargo, the floor of the cargo body having at least one longitudinal composite support beam that extends from a lower surface of the floor; and
   at least one mounting apparatus coupling the longitudinal rail of the chassis to the longitudinal composite support beam of the floor of the cargo body, the mounting apparatus comprising:
      a support beam coupler adhesively bonded to the longitudinal composite support beam;
      at least one connector comprising a plurality of legs and supported by the support beam coupler; and
      a chassis rail bracket coupled to the at least one connector beneath the longitudinal rail of the chassis.

25. The cargo vehicle of claim 24, wherein the plurality of legs extend downwardly form the support beam coupler.

26. The cargo vehicle of claim 24, wherein the support beam coupler includes a first vertical flange and a second vertical flange, the first and second vertical flanges adhesively bonded to the longitudinal composite support beam.

27. The cargo vehicle of claim 26, wherein the support beam coupler further comprises a horizontal portion extending perpendicular to the first and second vertical flanges and supporting the plurality of legs.

28. The cargo vehicle of claim 27, wherein the horizontal portion is integrally formed with the first and second flanges.

29. The cargo vehicle of claim 27, wherein the first vertical flange is adhesively bonded to a first lateral side of the longitudinal composite support beam, the second vertical flange is adhesively bonded to a second lateral side of the longitudinal composite support beam opposite the first lateral side, and the horizontal portion extends from the first vertical flange to the second vertical flange.

30. The cargo vehicle of claim 24, wherein at least a portion of the at least one connector is positioned between a bottom surface of the longitudinal composite support beam and an inner surface of the support beam coupler.

* * * * *